United States Patent [19]

Kimura

[11] Patent Number: 4,605,971

[45] Date of Patent: Aug. 12, 1986

[54] DOCUMENT READING DEVICE

[75] Inventor: Shigeki Kimura, Ibaraki, Japan

[73] Assignee: Mita Industrial Co., Ltd., Osaka, Japan

[21] Appl. No.: 741,894

[22] Filed: Jun. 6, 1985

[30] Foreign Application Priority Data

Jun. 11, 1984 [JP] Japan ................................. 59-119420

[51] Int. Cl.⁴ .............................................. H04N 1/12
[52] U.S. Cl. .................................. 358/285; 74/99 R; 74/110
[58] Field of Search ............... 358/285, 288, 293, 294; 74/37, 99 R, 110

[56] References Cited

U.S. PATENT DOCUMENTS

| 3,497,610 | 2/1970 | Langberg et al. | 358/285 |
| 3,764,741 | 10/1973 | Long | 358/285 |
| 4,219,850 | 8/1980 | Howard | 358/285 |
| 4,227,421 | 10/1980 | Weishew | 74/37 |
| 4,245,259 | 1/1981 | Pick | 358/285 |
| 4,449,152 | 5/1984 | Kurata et al. | 358/296 |
| 4,454,781 | 6/1984 | Orii | 74/99 R |

Primary Examiner—Ronald C. Capossela

Attorney, Agent, or Firm—Wenderoth, Lind & Ponack

[57] ABSTRACT

A document reading device comprising a document stand having a document placing surface and an optical reading means for optically reading the surface of a document placed on the document placing surface. The device further comprises a guide member defining a guide passage extending in a direction toward and away from the document placing surface, an oscillating member mounted such that its one end can reciprocate freely along the document placing surface in a predetermined scanning direction and in a direction opposite to it and the other end can freely reciprocate along the guide passage, and a driving source for oscillating the oscillating member which is capable of moving said one end of the oscillating member at a substantially constant speed in the scanning direction. The optical reading means is provided in the oscillating member. While said one end of the oscillating member is moved in the scanning direction at said substantially constant speed, the optical distance between the surface of the document placed on the document placing surface and the optical reading means is maintained substantially constant, and the optical reading means scans the surface of the document.

8 Claims, 6 Drawing Figures

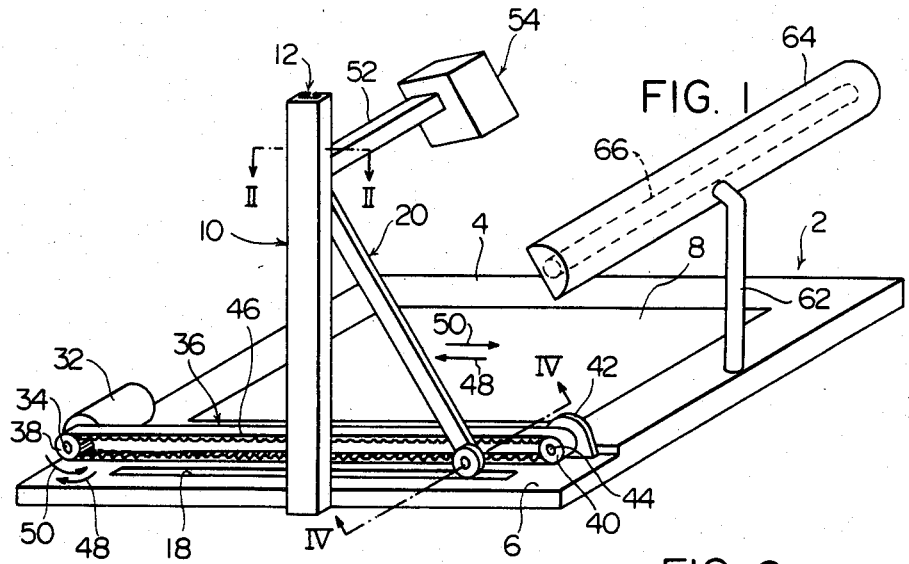
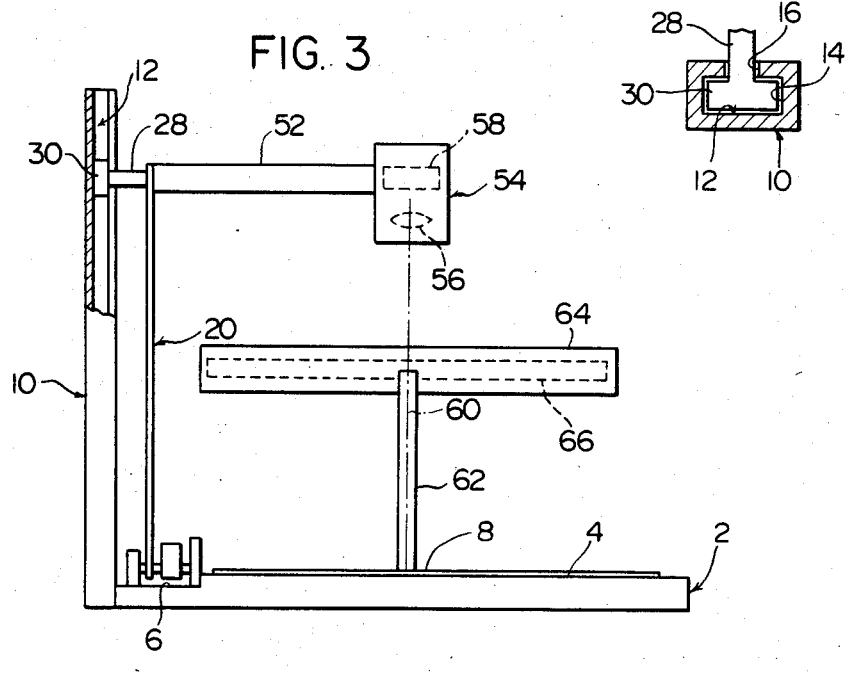

DOCUMENT READING DEVICE

FIELD OF THE INVENTION

This invention relates to a document reading device for optically reading a document and producing an electrical signal corresponding to the document.

DESCRIPTION OF THE PRIOR ART

In facsimiles, computers or the like, a document reading device adapted to read a document optically and produce an electrical signal corresponding to the document is used as an input device. A typical example of the document reading device comprises a document stand having a substantially plane surface on which to place the document to be read, and a movable optically reading means disposed above the document placing surface of the document stand. To read the document placed on the document placing surface, the reading means is moved and scans the document. It will be readily understood that in moving the reading means and scanning the document, the optical distance between the surface of the document and the reading means should be maintained substantially constant and the speed of scanning the document by the reading means should also be maintained substantially constant. In order to meet these requirements, the reading means is disposed such that it can make a reciprocating rectilinear movement substantially parallel to the document placing surface both in the scanning direction and in a direction opposite to it, and at least during its movement in the scanning direction, is moved at a substantially constant speed.

In the conventional document reading device mentioned above, a supporting and guiding frame extending substantially parallel to the document placing surface must be provided above the document placing surface in order to mount the reading means above the document placing surface such that it can make a reciprocating rectilinear movement substantially parallel to the document placing surface. This leads to the defect that owing to the provision of the supporting and guiding frame, the document reading device becomes comparatively bulky.

SUMMARY OF THE INVENTION

It is a primary object of this invention to provide a novel and improved document reading device which is much more compact than the conventional document reading device.

According to this invention, there is provided a document reading device comprising a document stand having a substantially plane document placing surface on which to place a document to be read, a guide member defining a guide passage extending in a direction toward and away from the document placing surface, an oscillating member mounted such that its one end can reciprocate freely along the document placing surface in a predetermined scanning direction and in a direction opposite to it and the other end can freely reciprocate along the guide passage, a driving source for oscillating the oscillating member which is capable of moving said one end of the oscillating member at a substantially constant speed in the scanning direction, and an optical reading means provided in the oscillating member for reading the surface of the document placed on the document placing surface, whereby while said one end of the oscillating member is moved in the scanning direction at said substantially constant speed, the optical distance between the surface of the document placed on the document placing surface and the optical reading means is maintained substantially constant, and the optical reading means scans the surface of the document.

Other objects of this invention will become apparent from the following description taken in conjunction with the accompanying drawings.

BRIEF DESCRIPTION OF THE DRAWINGS

FIG. 1 is a perspective view showing one embodiment of the document reading device constructed in accordance with this invention;

FIG. 2 is a partial sectional view taken along line II—II of FIG. 1;

FIG. 3 is a side elevation, partly in section, of the document reading device of FIG. 1;

DETAILED DESCRIPTION OF PREFERRED EMBODIMENTS

Figure 4:
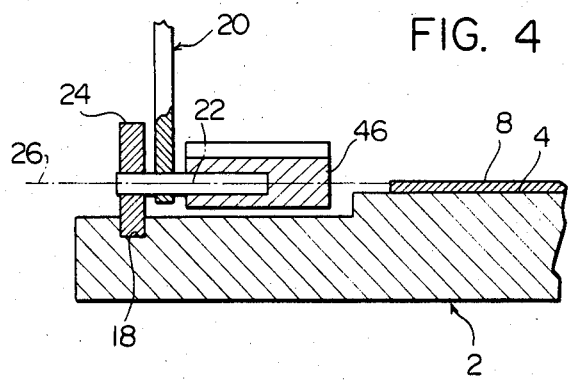
FIG. 4 is a partial sectional view taken along line IV—IV of FIG. 1.

With reference to the accompanying drawings, one specific embodiment of the document reading device constructed in accordance with this invention will be described in detail.

Referring to FIG. 1, the illustrated document reading device has a document placing stand 2 of a rectangular shape. The main portion 4 the upper surface of the document stand 2 (i.e., excluding a front side portion 6) is substantially plane, and defines a document placing surface for placing a document 8 to be read. Some step portion is formed between the main portion 4 and the front side portion 6 in the upper surface of the document stand 2, and the front side portion 6 is at a slightly lower level than the main portion 4 (see FIG. 3 also). The document 8 to be read is placed at a predetermined position on the upper surface main portion 4 of the document stand 2 with its surface to be read being directed upwardly. A proper mark indicating the position of placing the document 8 or a suitable restricting member (not shown) for positioning the document 8 may be provided on the main portion 4 of the upper surface of the document stand 2.

A guide member 10 is provided at the front surface of the document stand 2. The guide member 10 in the illustrated embodiment extends upwardly from its lower end fixed to the nearly central part of the front surface of the document stand 2 and is substantially perpendicular to the main portion 4 of the upper surface of the document stand 2. As clearly shown in FIG. 2, a guide channel 12 opened rearwardly is formed in the guide member 10. The guide channel 12 defining a guide passage has a deep portion 14 of a relatively large width and an open side portion 16 of a relatively narrow width. On the other hand, a guide groove 18 extending substantially perpendicularly to the guide channel 12 in the left-right direction in FIG. 1 is formed in the front side portion 6 of the upper surface of the document stand 2. The document reading device further includes an oscillating member 20. One end, the lower end, of the oscillating member 20 is movable along the guide groove 18. and the other end, i.e. the upper end, is movable along the guide channel 12. More specifically, as shown in FIGS. 3 and 4, a shaft 22 is rotatably mounted on the lower end of the oscillating member 20, and a roller 24 is rotatably mounted on the front end portion of the shaft 22. The roller 24, in turn, is received in the guide groove 18 for free rolling movement along it. The central axis 26 of the shaft 22 extends substantially parallel to the main portion 4 of the upper surface of the document placing stand 2 and substantially perpendicularly to the guide groove 18. As shown in FIG. 4, the outside diameter of the roller 24 is set so that the central axis 26 of the shaft 22 is nearly on the same level as the main portion 4 of the upper surface of the document placing stand 2, or more specifically on substantially the same level as the surface of the document 8 placed on the main portion 4. On the other hand, as shown in FIGS. 2 and 3, a shaft 28 extending substantially parallel to the shaft 22 is fixed to the upper end of the oscillating member 20, and a roller 30 is rotatably mounted on the front end portion of the shaft 28. The shaft 28 extends through the open side portion 16 of the guide channel 12 in the guide member 10, and the roller 30 is received in the deep portion 14 of the guide channel 12. The outside diameter of the roller 30 is substantially equal to the width of the deep portion 14 of the guide channel 12. It will be readily understood therefore that the roller 30 makes a rolling movement within the guide channel 12 to cause the upper end of the oscillating member 20 to reciprocate along the guide channel 12.

With reference to FIG. 1, a driving source 32 which may be a reversible electric motor is mounted on one side portion (the left side portion in FIG. 1) of the document stand 2. The output shaft 34 of the driving source 32 is drivingly connected to the oscillating member via a power transmission means shown generally at 36. The power transmission means 36 includes a pair of toothed pulleys 38 and 40 disposed in spaced-apart relationship in the left-right direction in FIG. 1. The pulley 38 is fixed to the output shaft 34 of the driving source 32. On the other hand, a supporting piece 42 is fixed to the other side portion (the right side portion in FIG. 1) of the document placing stand 2, and a supporting shaft 44 is fixed to the supporting piece 42. The pulley 40 is rotatably mounted on the supporting shaft 44. A wrapping power transmission element, more specifically an endless toothed belt 46, is wrapped about the pulleys 38 and 40. With reference to FIGS. 1 and 4, the lower travelling section of the belt 46 extends substantially parallel to the upper surface main portion 4 of the document stand 2 in the left-right direction in FIG. 1 (a direction perpendicular to the sheet surface in FIG. 3). The rear end portion of the shaft 22 fixed to the lower end of the oscillating member 20 is fixedly embedded in the lower travelling section of the belt 46. As a result, when the driving source 32 is normally rotated in the direction shown by an arrow 48, the lower end of the oscillating member 20 is moved in the direction of arrow 48. When the driving source 32 is rotated reversely in the direction shown by an arrow 50, the lower end of the oscillating member 20 is moved in the direction of arrow 50 (the motion of the oscillating member 20 will be described in more detail hereinafter).

With reference to FIGS. 1 and 3, in the illustrated embodiment, a supporting member 52 is fixed to, and extends from, the upper end of the oscillating member 20. A reading head 54 is fixed to the rear end of the supporting member 52. The reading head 54 includes an image-forming lens 56 and an optical reading means 58. The optical reading means 58 may be constructed of many image sensors, such as CCDs, arranged rectilinearly in the left-right direction in FIG. 3 (a direction perpendicular to the sheet surface in FIG. 5 substantially parallel to the upper surface main portion 4 of the document placing stand 2. The optical axis 60 of the image-forming lens 56 and the optical reading means 58 is positioned such that it crosses the surface of the document 8 placed on the upper surface main portion 4 of the document stand 2 on the central axis 26 of the shaft 22 fixed to the lower end of the oscillating member 20 (see FIG. 5 also). In other words, the image-forming lens 56 and the optical reading means 58 are positioned such that the light reflected from a rectilinear area, along the central axis 26, of the surface of the document 8 placed on the main portion 4 of the upper surface of the document stand 2 falls onto the optical reading means 58 via the image-forming lens 56. As shown in FIGS. 1 and 3, an upwardly extending supporting post 62 is mounted on the side portion (the right side portion in FIG. 1) of the upper surface of the document placing stand 2. A reflection cover 64 is mounted on the upper end of the supporting post 62, and a document illuminating lamp 66 for illuminating the surface of the document 8 on the document stand 2 is set within the reflection cover 64.

The operation of the document reading device described above will now be described mainly with reference to FIGS. 1 and 5. At the start of reading the document, the oscillating member 20 and the reading head 54 mounted on it are at their start-of-scan positions shown by two-dot chain lines 20A and 54A in FIG. 5. In this state, the driving source 32 is normally rotated at a substantially constant speed in the direction shown by the arrow 48. As a result, the lower end of the oscillating member 20 is moved along the surface of the document 8 placed on the upper surface main portion 4 of the document stand 2 in the direction of arrow 48 at a substantially constant speed to the position shown by a two-dot chain line 20C in FIG. 5 past the position shown by a two-dot chain line 20B in FIG. 5. While the lower end of the oscillating member 20 moves from the position shown by a two-dot chain line 20A to the position shown by the two-dot chain line 20B, the upper end of the oscillating member 20 gradually rises along the guide channel 12, and therefore, the reading head 54, while gradually rising, pivots clockwise in FIG. 5 and moves to the position shown by a two-dot chain line 54B from the position shown by a two-dot chain line 54A. Thus, the upstream half $h_1$ of the surface of the document 8 illuminated by the lamp 66 is scanned by the reading head 54. While the lower end of the oscillating member 20 moves to the position shown by the two-dot chain line 20C from the position shown by the two-dot chain line 20B, the upper end of the oscillating member 20 gradually descends along the guide channel 12. Hence, the reading head 54, while gradually descending, pivots clockwise in FIG. 5 and moves from the position shown by the two-dot chain line 54B to the position shown by a two-dot chain line 54C. Thus, the downstream half $h_2$ of the surface of the document 8 illuminated by the lamp 66 is scanned by the reading head 54. During the scanning of the surface of the document 8 by the reading head 54, the lower end of the oscillating member 20 is moved at a substantially constant speed slong the surface of the document 8 in the scanning direction shown by arrow 48, and the optical reading means 58 of the reading head 54 receives the reflected light from that rectilinear area of the document 8 which corresponds to the lower end of the oscillating member 20, or more specifically, from the rectilinear area of the document 8 along the central axis 26 of the shaft 22 fixed to the lower end of the oscillating member 20. It will be appreciated therefore that the speed of scanning the surface of the document 8 is substantially constant. The optical distance between the surface of the document 8 and the reading head 54 (more specifically, the image-forming lens 56 and the optical reading means 58) is substantially equal to the distance between the central axis 26 and the reading head 54, and remains constant. Thus, the surface of the document 8 is properly scanned by the reading head 54, and the optical reading means 58 of the reading head 54 produces an electrical signal corresponding to the image on the surface of the document 8. Such an electrical signal can be supplied to the main body (not shown) of a facsimile, a computer or the like.

Figure 5:
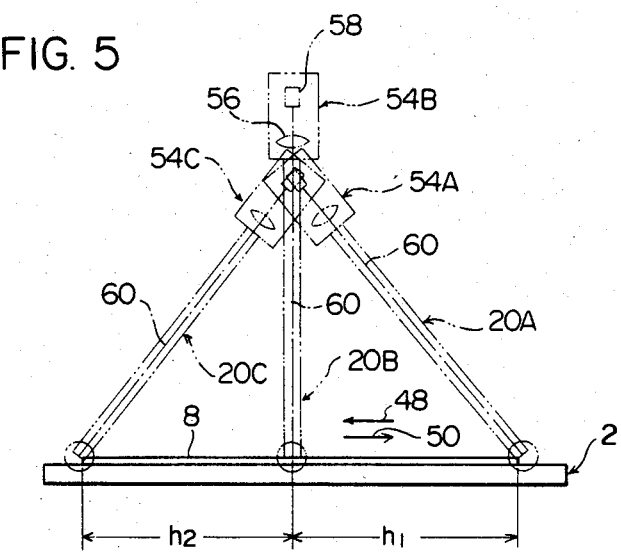
FIG. 5 is a simplified front elevation for explaining the operation of the document reading device of FIG. 1.

As can be seen by reference to FIG. 5, the relative angle between the optical axis 60 of the reading head 54 and the surface of the document 8 gradually changes during the scanning of the surface of the document 8 (more specifically, during the scanning of the upstream half $h_1$ of the surface of the document 8, the aforesaid relative angle gradually increases, and during the scanning of the downstream half $h_2$ of the surface of the document 8, the aforesaid relative angle gradually decreases). Furthermore, the illuminance of the surface of the document 8 illuminated by the lamp 66 is not entirely uniform. Hence, the changes in relative angle and the non-uniformity of illuminance cause changes in the intensity of the reflecting light incident upon the otical reading means 58. However, such changes in the intensity of the reflecting light are relatively small and cause no practical trouble. If desired, an electrical compensation for compensating the changes in the intensity of the reflecting light may be added to the output electrical signal of the optical reading means 58 so that the compensated electrical signal is supplied to the main body of a facsimile, a computer or the like.

Figure 6:
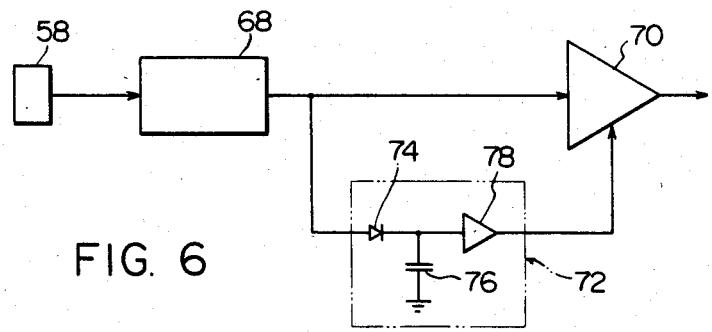
FIG. 6 is a simplified block diagram showing one example of a compensation circuit for adding the desired compensation to an output signal of an optical reading means in the document reading device of FIG. 1.

FIG. 6 shows one examples of means for carrying out the aforesaid electrical compensation. The output signal of the optical reading means 58 is fed into a processing circuit 68. The output signal of the processing circuit 68 is fed into a gain control amplifier 70, and the output signal of the amplifier 70 is fed into the main body of a computer or the like. The processing circuit 68, which is known per se, performs required treatments such as amplification and waveform regulation on the input signal. To carry out the aforesaid electrical compensation, the output of the processing circuit 68 is fed also into a compensation circuit 72, and the output signal of the compensation curcuit 72 is fed into the amplifier 70 as a gain control signal. The compensation circuit 72 has a diode 74, a condenser 76 and an amplifier 78. The compensation circuit 72 outputs a signal corresponding to the amount of charge of the condenser 76, and the amount of charge of the condenser 76 is gradually varied by a peak value of the output signal of the processing circuit 68 and therefore by a value corresponding to the intensity of the light reflected from the white portion of the document 8. Thus, the compensation circuit 72 controls the gain of the gain control amplifier 70 according to the variations in the peak value of the output signal of the processing circuit 68 which are caused by the changes in relative angle and the nonuniformity in illuminance mentioned above. Consequently, the conpensation circuit 72 compensates the variations caused by the changes in relative angle and the nonuniformity of illuminance.

When the oscillating member 20 and the reading head 54 mounted on it are moved to end-of-scan position shown by two-dot chain lines 20C and 54C in FIG. 5, the driving source 32 is deenergized. Thereafter, the driving source 32 is reversely rotated at an arbitrary speed in the direction shown by an arrow 50. As a result, the oscillating member 20 and the reading head 54 mounted on it are returned from the end-of-scan positions shown by the two-dot chain lines 20C and 54C to the start-of-scan positions shown by the two-dot chain lines 20A and 54A. If required, a suitable detecting means (not shown) which produces an electrical signal when the oscillating member 20 and the reading head 54 mounted on it are held at the start-of-scan positions and the end-of-scan positions may be provided in order to control the driving source 32.

In the above illustrated embodiment, the guide member 10 is disposed nearly centrally in the document stand 2. If desired, it may be disposed in either of its end portions. Conveniently, the guide channel 12 of the guide member 10 extends substantially perpendicularly to the upper surface main portion 4 of the document stand 2, but this is not essential. For example, the guide channel 12 may extends rectilinearly with tilting to the upper surface main portion 4 of the document stand 2, or may extend in a curve, so long as it extends in a direction toward and away from the upper surface main portion 4 of the document stand 2 and can properly guide the upper end of the oscillating member 20 and oscillate the oscillating member 20 while the lower end of the oscillating member 20 is moved along the upper surface main portion 4 of the document stand 2.

While the document reading device of the present invention has been described in detail with reference to its preferred embodiments taken in conjunction with the accompanying drawings, it should be understood that the present invention is not limited to these specific embodiments and various changes and modifications are possible without departing from the scope of the invention.

What is claimed is:

1. A document reading device comprising a document stand having a substantially plane document placing surface on which to place a document to be read, a guide member defining a guide passage extending in a direction toward and away from the document placing surface, an oscillating member mounted such that its one end can reciprocate freely along the document placing surface in a predetermined scanning direction and in a direction opposite to it and the other end can freely reciprocate along the guide passage, a driving source for oscillating the oscillating member which is capable of moving said one end of the oscillating member at a substantially constant speed in the scanning direction, and an optical reading means provided in the oscillating member for reading the surface of the document placed on the document placing surface, whereby while said one end of the oscillating member is moved in the scanning direction at said substantially constant speed, the optical distance between the surface of the document placed on the document placing surface and the optical reading means is maintained substantially constant, and the optical reading means scans the surface of the document.

2. The device of claim 1 wherein the guide passage extends substantially perpendicularly to the document placing surface.

3. The device of claim 1 wherein the optical reading means includes a plurality of image sensors arranged in a direction substantially perpendicular to the scanning direction and substantially parallel to the document placing surface.

4. The device of claim 3 wherein the image sensors are comprised of CCDs.

5. The device of claim 1 which further includes a power transmission means comprising a pair of pulleys disposed in spaced-apart relationship in the scanning direction and a wrapping power transmission element wrapped over the pulleys, and the driving source is drivingly connected to the oscillating member via the power transmission means.

6. The device of claim 5 wherein the driving source is a reversible electric motor connected to one of the pair of pulleys, and the oscillating member is connected to the wrapping power transmission element.

7. The device of claim 1 wherein a guide grooves extending in the scanning direction is provided in the document stand, and a roller adapted to make a rolling movement within the guide groove is rotatably mounted on said one end of the oscillating member.

8. The device of claim 7 wherein the central axis of the roller extends substantially perpendicularly to the scanning direction and within nearly the same plane as the document placing surface.

* * * * *